United States Patent [19]

Seichter et al.

[11] 3,857,051

[45] Dec. 24, 1974

[54] ROTARY POSITION TRANSDUCER ASSEMBLY USING HYDROSTATIC BEARINGS

[75] Inventors: Daniel J. Seichter, New Holstein; Orville W. Ehrhardt, Fond Du Lac, both of Wis.

[73] Assignee: Giddings & Lewis, Inc., Fond du Lac, Wis.

[22] Filed: Aug. 30, 1973

[21] Appl. No.: 392,959

[52] U.S. Cl. .................. 310/36, 318/653, 310/90, 308/DIG.1
[51] Int. Cl. ......................................... H02k 33/00
[58] Field of Search .................. 310/36, 38, 15, 90; 318/653; 335/288; 317/123; 336/115; 308/9, DIG. 1

[56] References Cited
UNITED STATES PATENTS

| | | | |
|---|---|---|---|
| 1,704,783 | 3/1929 | Bing | 335/288 |
| 2,313,682 | 3/1943 | Stuart, Jr. | 318/653 X |
| 2,415,819 | 2/1947 | Halpert et al. | 318/653 |
| 2,554,874 | 5/1951 | Oetzel | 335/288 |
| 3,089,044 | 5/1963 | Bolton | 310/36 |
| 3,118,075 | 1/1964 | Dunn et al. | 310/36 |
| 3,152,275 | 10/1964 | Aske | 310/36 X |

Primary Examiner—Mark O. Budd
Attorney, Agent, or Firm—Wolfe, Hubbard, Leydig, Voit & Osann, Ltd.

[57] ABSTRACT

A transducer having stator and rotor elements with electrical means for indicating and establishing the rotational position of a machine tool worktable or the like. The transducer rotor is rigidly and accurately supported by hydrostatic bearings for friction-free movement relative to the stator so as to enable the transducer to precisely position the worktable independent of external loads applied to the worktable.

7 Claims, 5 Drawing Figures

Patented Dec. 24, 1974 3,857,051

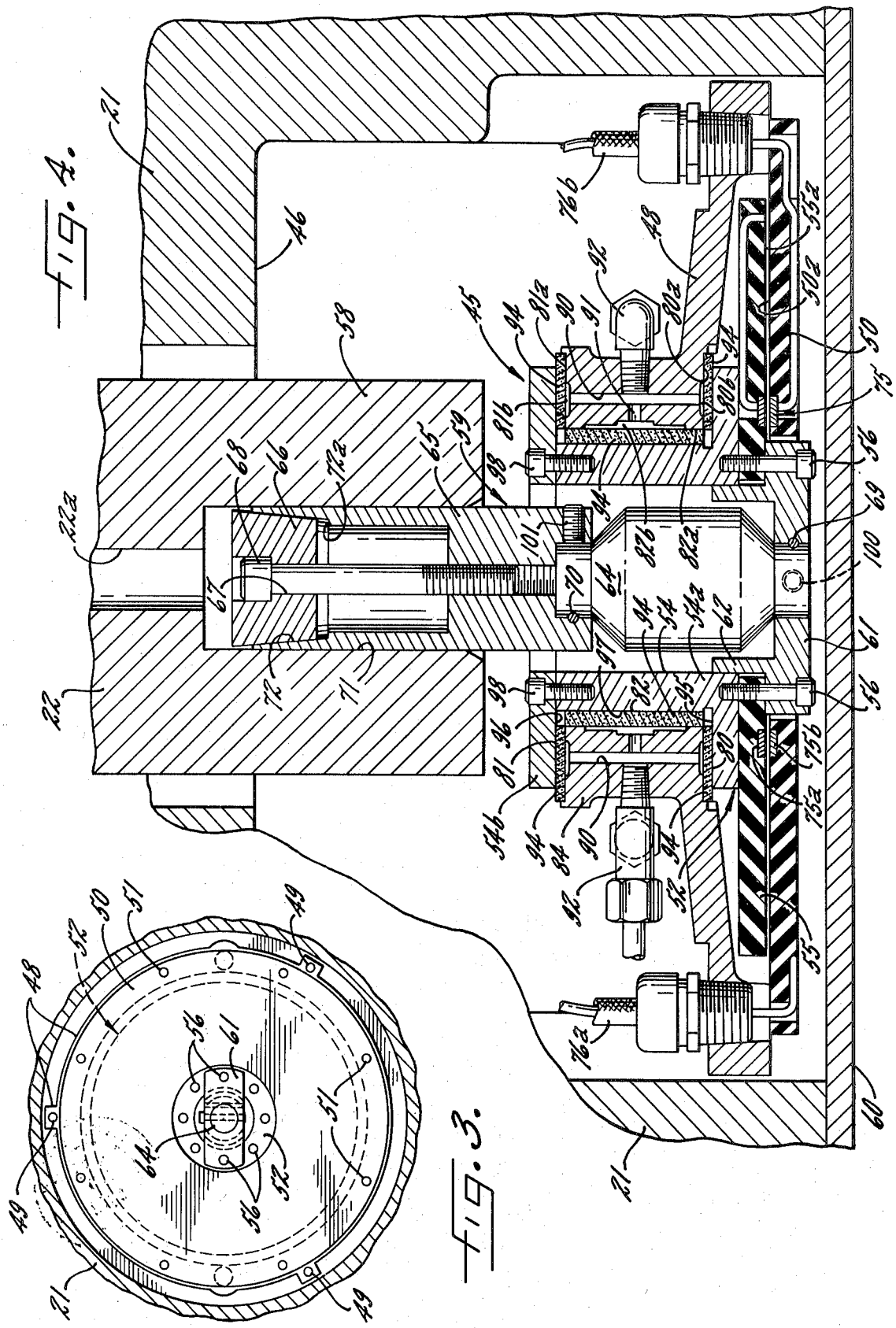

ROTARY POSITION TRANSDUCER ASSEMBLY USING HYDROSTATIC BEARINGS

DESCRIPTION OF THE INVENTION

The present invention relates to rotary position transducers, and more particularly to such transducers for establishing and indicating the rotary position of machine tool worktables with a high degree of accuracy.

Transducers which heretofore have been used for indicating the rotary position of machine tool worktables have been bulky, expensive, and often have lacked the necessary accuracy. In present transducer constructions, the rotatable element of the transducer is commonly journalled on ball or roller type contact bearings. When such transducers are utilized in precision machine tool worktables, a relatively high preload must be applied to the transducer bearings for achieving sufficient rigidity to prevent excessive runout. Such preloading, however, increases bearing friction and causes inaccuracies due to torsional deflection resulting from the greater drive torque required in turning the transducer rotor. Moreover, such antifriction ball or roller type contact bearings have resulted in transducers which are relatively bulky and heavy, and thereby, difficult to manipulate during assembly of the machine tool, particularly when the transducer is located beneath the table.

It is an object of the present invention to provide a transducer assembly adapted to produce voltage signals indicative of the precise rotary position of a machine tool worktable.

Another object is to provide a rotary position transducer as characterized above that has a compact, lightweight design which makes it applicable for installation in areas where space is limited and results in more responsive operation by reason of its lower inertia. A related object is to provide such a transducer construction which requires minimum alignment efforts during installation.

A further object is to provide a rotary position transducer of the above kind that has rotor supporting bearings adapted to achieve precision rotational characteristics without introducing harmful frictional forces.

Other objects and advantages of the invention will become apparent upon reading the following detailed description and upon reference to the drawings, in which:

FIG. 3 is a fragmentary section taken from the plane of line 3—3 in FIG. 2;

FIG. 4 is an enlarged fragmentary vertical section of the rotary position transducer shown in FIG. 2.

Figure 1:
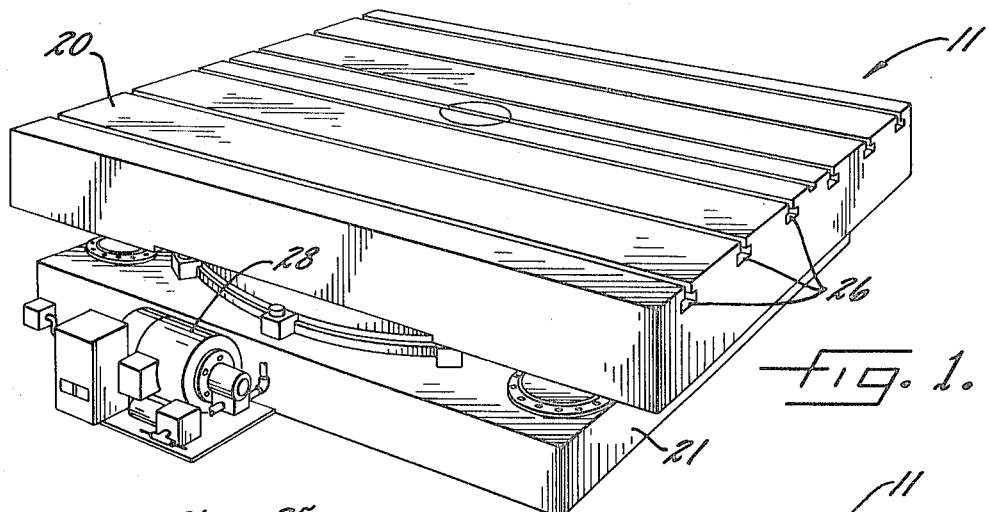
FIG. 1 is a perspective of a machine tool rotary worktable with a rotary position transducer embodying the present invention.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Referring more particularly to the drawings, there is shown an illustrative rotary worktable 11 adapted to rigidly support a workpiece during precision machining operations and to accurately rotate the workpiece to permit machining on different sides in a single set up. The rotary worktable 11 in this case comprises a rectangular platen 20 rotatably supported upon a base 21. The platen 20 has a flat finished upper surface formed with a plurality of spaced apart inverted T-slots 26 within which suitable clamps may be secured in a well-known manner for holding a workpiece on the platen. For indexing the platen 20 and a workpiece mounted thereon to a chosen position or rotating it during a contour machining operation on the workpiece, a conventional drive means is provided. The drive means in this instance includes a servo drive 28 and a control 29 diagrammatically illustrated in FIG. 5.

In order to maintain the platen 20 at a precisely centered position for rotational movement relative to the base 21, the platen has a central pivot post 22 supported within a hydrostatic bearing 31. The pivot post 22 in this case is mounted in a central stepped bore 24 formed in the platen 20 and is fixedly secured to the platen by screws 25. The hydrostatic bearing 31 comprises an upstanding cylindrical hub 32 fixedly attached to the base 21 by screws 34 extending upwardly from the bottom of the base. The hub 32 surrounds an outer cylindrical portion 35 of the pivot post 22 and is formed with lands 36 at opposite ends thereof which define a plurality of hydrostatic bearing chambers or pads about the pivot post portion 35. The bearing chambers are supplied with pressurized oil from passages 38 formed in the hub which are connected to an appropriate oil supply source by lines 39. A sealing and pilot ring 40 is secured within a counterbore 41 in the top of the base and is held in place by an overlapping bottom edge of the hub 32. It will be understood that to facilitate rotational movement of the platen 20 relative to the base 21 suitable bearings are provided between the platen and base at a radially spaced distance from the pivot post 22. Such a platen bearing support is shown in Seibert U.S. application Ser. No. 241,724, filed Apr. 6, 1972 and assigned to the assignee of the present application.

For establishing and indicating the rotational position of the platen 20 relative to the base, a rotary transducer 45 is mounted in a recess 46 formed at the bottom of the base 21. The rotary transducer 45 includes a stationary support 48 secured to the base 21 by a plurality of circumferentially spaced screws 49 and a flat radial stator plate 50 fixed to the underside of the support 48 by screws 51. A rotor 52 having a hub 54 and a flat radial plate 55 affixed thereto by screws 56 is mounted on the support 48 and connected to a lower cylindrical stem 58 of the pivot post 22 by a flexible drive coupling 59 for rotation with the platen 20 relative to the stator 50 and the support 48. The rotor hub 54 is supported such that the rotor plate 55 is disposed in face-to-face relation with the stator plate 50 with a small air gap between them. To protect the transducer 45 from dust or other foreign materials, a removable cover plate 60 encloses the transducer within the base recess 46.

The drive coupling 59 includes a flexible coupler 64, an extension 65, a wedge 66, and a drawbolt 68 and is adapted to permit slight axial movement of the table platen 20 relative to the base 21 and compensate for any misalignment between the rotary axes of the platen 20 and the transducer rotor 52. To connect the drive coupling 59 to the rotor 52, a drive flange 61 is secured within a central opening in the rotor plate 55 by two of the screws 56 and is formed with a bifurcated central projection 62 extending upwardly in close relation with an internal cylindrical bore of the hub. The lower end of the flexible coupler 64 is secured within a central bore of drive flange 61 by a pin 69 passing through the side of the drive flange. The extension 65 is cylindrical-shaped having one end secured to an upper end of the flexible coupler 64 by a pin 70 and the other end positioned within an internal bore 71 of the pivot post stem 58. The upper end of the extension has a tapered bore 72 which supports the complementary shaped tapered wedge 66, and the drawbolt 68 extends through a clearance bore 67 of the wedge 66 to engage a threaded bore of the extension. By drawing the wedge 66 into the tapered bore 72 through adjustment of the drawbolt 68, the upper sides of the extension 65 may be expanded so as to provide a desired frictional drive contact between the extension 65 and the pivot post 22. To prevent accidental overstressing of the walls of the extension 65 by the wedge 66, the tapered bore 72 is formed with an annular shoulder 72a which serves to limit drawing in movement of the wedge 66. The bore 67 of the wedge 66, in addition to providing a clearance bore through which the screw 68 projects, preferably is threaded so that upon removal of the screw 68 it can receive a suitable draw bolt inserted from the top side of the pivot post 22 through a central bore 22a therein to back off the wedge 66 from the tapered bore 72 and thereby release the extension 65 from the pivot post 22 if desired.

The rotor plate 55 and stator plate 50 are provided with conventional electrical position signalling and measuring means, such as that manufactured and sold under the trademark "Inductosyn." In such arrangements, the opposed faces 50a, 55a of the stator and rotor plates 50, 55, respectively, each carry a series of interconnected hairpin-like conductors. A pair of two wire conductors 76a carry an input to the stator 50 conductors. Output voltage in the rotor conductors resulting from relative movement of the plates is transmitted through a rotary transformer 75 having primary windings 75a located in the rotor plate 55 and secondary windings 75b located in the stator plate 50. A pair of conductors 76b carry the output signal of the transformer 75 to the control 29 which is adapted to establish a prescribed position of the platen and rotor through operation of the servo drive 28.

Figure 5:
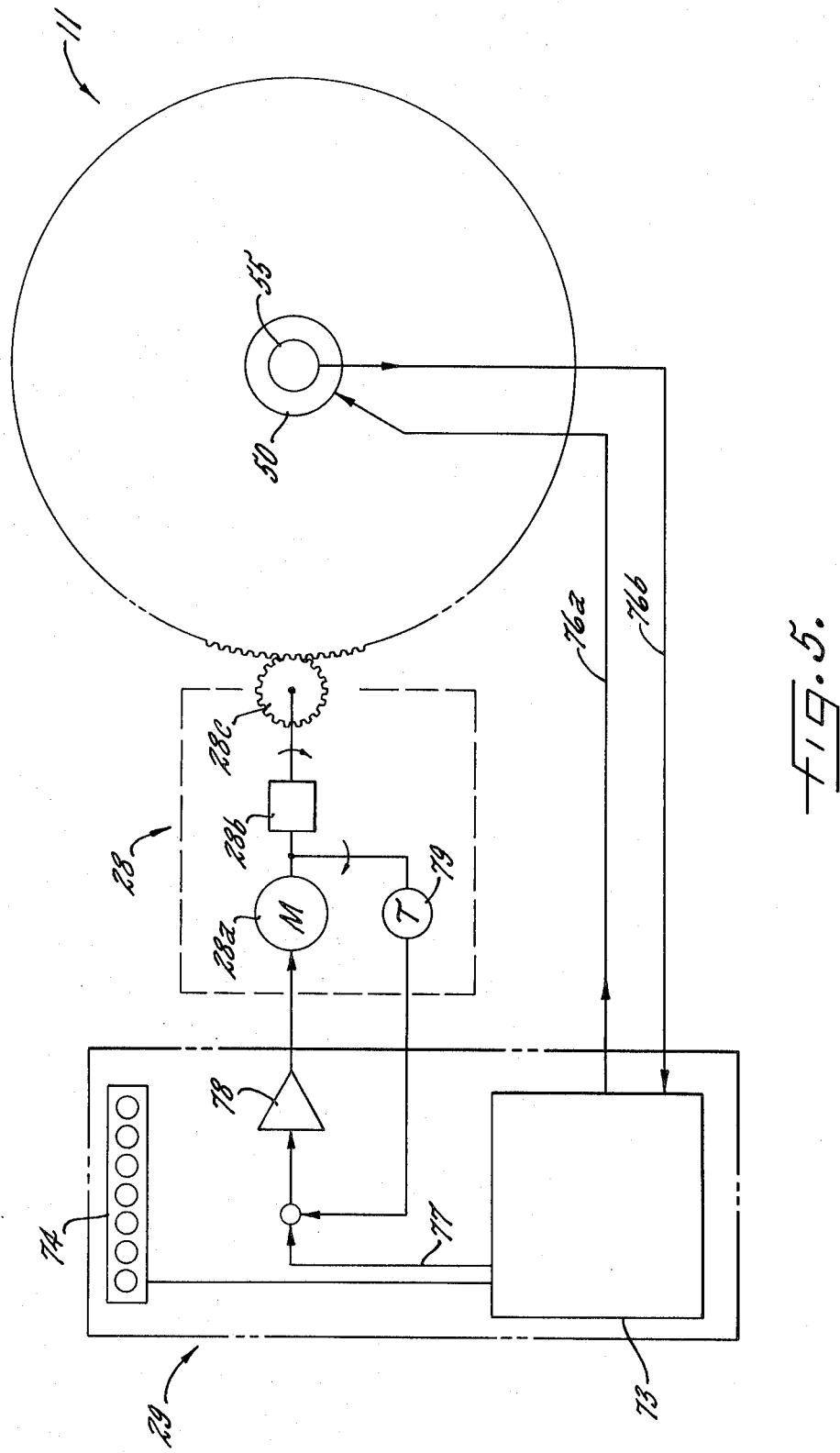
FIG. 5 is a diagrammatic illustration of the drive means and the control for the worktable shown in FIG. 1.

The operation of the servo drive 28, control 29, and the transducer 45 of the illustrated worktable may be more specifically understood upon reference to FIG. 5. The servo drive 28 in this case includes a motor 28a, a gear box 28b and a pinion 28c that is in driving engagement with the platen 20 of the table 11. The control 29 preferably is adapted to command the table drive 28 to rotate the table 11 at variable rates of speed such as would be required in a contouring operation, or alternatively, to rotate the table to a desired angular position at which location a machining operation could be performed. To this end, command signals originating in a numerical control unit 73 from a tape read out 74 of the control 29 are carried over the conductors 76a to the hairpin conductors of the stator 50 of the rotary transducer. The command voltage signal in the conductors of the stator 50 causes a voltage signal to be generated in the rotor 55 hairpin conductors. The level and sign of the signal is dependent upon the relative position of the stator and rotor conductors and the level of the command signal. The voltage generated in the rotor conductors is transmitted through the transformer 75 and conductors 76b to the numerical control unit 73 as the feedback signal of the transducer. The feedback signal in the conductor 76b is processed in the numerical control unit 73 in a known manner to produce a position error signal in a conductor 77. This error signal is then amplified 78 and used to control the servo drive 28. A tachometer 79 driven by the servo drive 28 provides a velocity feedback loop around the motor 28a and amplifier 78 which serves to control the velocity feed rate of the motor and improve the stiffness of the drive.

While in theory conventional "Inductosyn" type rotary transducers are capable of high accuracy performance in indicating and establishing a platen position, in actual use such transducers are dependent upon the maintenance of a minimum constant gap between the rotor and stator plates and the precise axial alignment of the plates. Heretofore, it has not been possible to accurately maintain the spacing and axial relationship of the transducer elements without imparting an undesirable frictional resistance to their relative movement by high preloading of the rotor support bearings. Moreover, in such prior transducers, proper positioning of the bearing elements could be achieved only by fit and try manipulation during final assembly of the machine, which was time consuming and often unsatisfactory.

Figure 2:
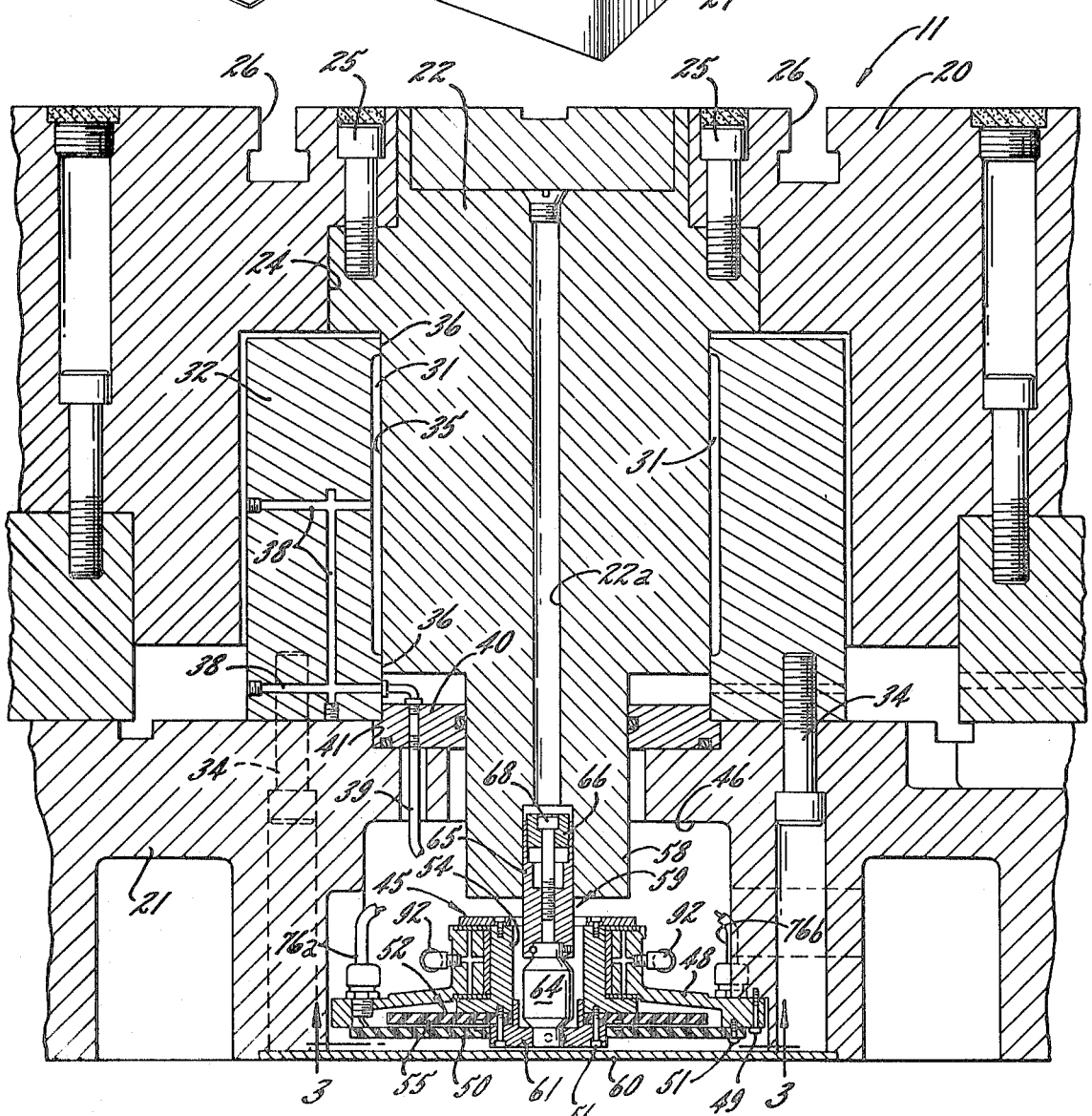
FIG. 2 is an enlarged fragmentary vertical section through the rotary worktable shown in FIG. 1, showing the rotary position transducer.

In accordance with the present invention, hydrostatic bearing means are provided for rigidly and accurately supporting the transducer rotor for friction-free movement relative to the stator so as to enable the transducer to consistently position the machine tool worktable with high accuracy and precision. In the illustrated embodiment, as shown in FIGS. 2 and 4, the rotor hub 54 is supported for rotational movement by opposed hydrostatic thrust bearings 80, 81 and a hydrostatic radial bearing 82. To form these hydrostatic bearing supports, the stationary support 48 includes an upstanding cylindrical projection 84 with an internal cylindrical surface 82a and annular surfaces 80a, 81a, at opposite ends thereof. Each of the surfaces 80a, 81a, 82a are formed with an annular recess 80b, 81b, 82b, respectively, and air supply passages 90, 91 in the cylindrical projection 84 communicate with the recesses 80b, 81b, 82b. In this case, a plurality of longitudinal passages 90 communicate between the annular recesses 80b, 81b on opposite sides of the support projection 84 and radial passages 91 extend between the longitudinal passages 90 and the recess 82b for the internal cylindrical surface 82a. A pair of air supply lines 92 threadably engage the projection 84 to direct pressurized air into the air passages 90, 91. To meter the flow of air to each of the bearings 80, 81, 82, a relatively thin porous carbon bearing liner 94 is attached to each of the three surfaces 80a, 81a, 82a by appropriate fastening means, such as an adhesive.

The rotor hub 54 in this instance has an outer periphery formed with a cylindrical surface 97 and annular surfaces 95, 96 which are adapted to mate closely with the contiguous surfaces formed by the carbon bearing liners 94. To facilitate assembly of the rotor 52 up on the support 48, the hub 54 has a two-part construction including a flanged member 54a which defines one of the annular surfaces 95 and the cylindrical surface 97 and a removable radial plate 54b secured to the upper end of the flanged member 54a by screws 98 to form the other annular surface 96. For accommodating a hydrostatic air film, the clearance space between the various bearing surfaces preferably is about 0.0002 inches on each side.

When the rotor 52 is mounted on the support 48 and pressurized air supplied to the passages 90 and 91, the rotor 54 is thereby supported at each of the surfaces 95, 96, 97 in close relation to the bearing liners 94 by a thin cushion of air for friction-free movement. Such hydrostatic bearings have been found to accurately and rigidly support the rotor in a constant speed spaced relation to the stator and the resulting friction-free support further enables the rotor to follow table movement without undesirable lag. Since there is no necessity for roller or ball contact bearings, the weight and size of the transducer also is substantially reduced, making it applicable for installation in areas where space is limited and causing its operation to be more responsive by reason of the lower inertia. Because the air bearing contributes no inaccuracy to the transducer assembly, the inherent accuracy of the measuring instrument can be delivered to the workpiece. Thus, the transducer of the present invention has been found to be capable of generating a machine tool worktable position with much greater precision than transducers heretofore known. For example, tests have determined that such a transducer can consistently position an eight foot diameter rotary worktable weighing 22,000 pounds to a directed angular position within an accuracy plus-or-minus 1 second of arc. On the perimeter of the table, such positioning tolerance represents a distance of 0.00023 inches.

The hydrostatic bearings of the present invention may further be accurately assembled and aligned with a minimum of effort. In fact, it is possible to make final assembly of the transducer drive coupling to the table pivot post under blind conditions, such as commonly occurs when the transducer is located beneath the worktable. Disassembly of the unit similarly may be conveniently accomplished.

Assembly of the transducer, for example, may be effected in the following manner. The drive coupling 59 preferably should first be bench assembled. The extension 65 is pinned to one end of the flexible coupler 64 and the drive flange 61 is pinned to the opposite end. Set screws 100, 101 may be utilized for temporary assembly purposes, prior to installation of the pins 69, 70. The wedge 66 and bolt 68 are then loosely secured to the extension.

The transducer 45, including the support 48, hub 54, and stator and rotor plates 50, 55, is then temporarily mounted in position below the post 22. This may be accomplished by mounting the transducer 45 on a suitable pilot plug which can be inserted into the bore 71 at the lower end of the post 22 and be temporarily held in place by a drawbolt extending downwardly from the upper end of the post. With the transducer supported in place by the pilot plug, screw holes for securing the transducer support 48 to the base 21 are located and machined by spotting through the mounting holes in the support 48. The transducer may then be loosely secured to the bore 21 by the mounting screws 49 and the pilot plug removed. The transducer 45 is then adjusted radially to align the central bore of the transducer hub 54 with the axis of the post 22 to a run-out preferably within 0.00025 T.T.R., as registered by an appropriate electronic indicator that may be supported from the lower end of the post 22 for cooperation with the bore of the hub 54. The hydrostatic bearings for both the table 20 and transducer 45 are energized for this step, and the transducer rotor is locked into place. Radial clearance between the mounting holes in the support 48 and the screws 49 permit limited, but adequate, radial adjustment of the support on the base to achieve proper axial alignment of the transducer. When the transducer has been properly aligned, the screws 49 are torqued to rigidly lock the support to the base.

The drive coupling 59 may then be assembled into its final position and the drive flange 61 secured to the rotor hub 54 by the screws 56. The bolt 68 is then torqued, preferably to about 75 inch pounds, to cause the wedge 66 to expand the walls of the extension 65 and frictionally lock the drive coupling to the post 22. It will be seen that such a method of assembly of the rotary transducer unit 45 assures precision axial alignment of the transducer with the rotary axis of the table so as to achieve the precision accuracy of which such "Inductosyn" type transducers are capable.

While the transducer of the present invention is particularly applicable for positioning of machine tool worktables, it will be understood that it may be similarly utilized for positioning other relatively rotatable members.

We claim as our invention:

1. A transducer for indicating the rotary position of a rotatable member relative to a base upon which said member is mounted, comprising
  a stationary support within said base,
  a stator plate secured to said stationary support,
  a rotor having a plate positioned in closely spaced relation with said stator plate, said rotor being formed with an outer cylindrical support surface and outwardly extending annular surfaces at opposite ends thereof,
  hydrostatic bearing means associated with said stationary support for supporting said rotor for friction-free rotational movement with respect to said support, said hydrostatic bearing means including a radial hydrostatic bearing for supporting said cylindrical rotor surface and a hydrostatic thrust bearing for supporting each of said annular surfaces,
  means coupling said rotor to said member for rotational movement with said member,
  and electrical control means consisting of a first series of electrical conductors mounted on said stator plate and a second series of electrical conductors mounted on said rotor plate in closely spaced relation to said first series for indicating the rotational position of said rotor plate relative to said stator plate.

2. The transducer of claim 1 in which a porous carbon liner is secured adjacent each of the cylindrical and annular surfaces of said stationary support for metering the flow of air to said hydrostatic bearings.

3. A transducer of claim 2 in which said air passages include a plurality of longitudinally extending passageways extending between the annular surfaces of said stationary support and a plurality of passageways communicating between said longitudinal passageways and the cylindrical surface of said stationary support.

4. The transducer of claim 3 in which said hub includes a flanged member defining said cylindrical rotor surface and one of said annular surfaces and a selectively removable radial flange defining the other of said rotor annular surfaces.

5. A transducer for indicating the rotary position of a rotatable member relative to a base upon which said member is mounted, comprising a stationary support within said base having an internal cylindrical surface and a pair of annular surfaces at opposite ends thereof, said stationary support being formed with passageways communicating from an inlet port to said cylindrical and radial surfaces, a stator plate secured to said stationary support, a rotor having a plate positioned in closely spaced relation with said stator plate and a hub formed with a cylindrical surface and a pair of annular surfaces, said cylindrical and annular hub surfaces being disposed in close complementary relation to said stationary support surfaces, means for supplying pressurized air to the inlet port of said stationary support to provide a hydrostatic bearing support between the cylindrical and annular surfaces of said stationary support and the complementary surfaces of said rotor for supporting said rotor for friction free rotational movement with respect to said support, means coupling said rotor to said member for rotational movement with said member, and electrical control means consisting of a first series of electrical conductors mounted on said stator plate and a second series of electrical conductors mounted on said rotor plate in closely spaced relation to said first series for indicating the rotational position of said rotor plate relative to said stator plate.

6. The transducer of claim 5 in which said coupling means has a friction drive connection with said rotatable members and is flexible to compensate for slight misalignment between the rotary axis of said member and the axis of said rotor.

7. The transducer of claim 5 in which said coupling means includes a flexible coupler secured at one end to said rotor and having an extension of the other end protruding into a central bore formed in said rotatable member, said coupler extension having an inwardly tapered axial bore at its outer end, a wedge mounted within said bore, and means for selectively drawing said wedge into said tapered extension bore to expand the sidewalls of said extension and provide a desired frictional driving contact between said extension and said rotatable member.

* * * * *